(12) United States Patent
Nakao et al.

(10) Patent No.: US 11,560,061 B2
(45) Date of Patent: Jan. 24, 2023

(54) MOTOR DRIVE DEVICE AND ELECTRIC VEHICLE SYSTEM

(71) Applicant: Hitachi Astemo, Ltd., Hitachinaka (JP)

(72) Inventors: Noriya Nakao, Tokyo (JP); Fumikazu Takahashi, Hitachinaka (JP); Kenichi Yoshida, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 31 days.

(21) Appl. No.: 17/284,889

(22) PCT Filed: Sep. 12, 2019

(86) PCT No.: PCT/JP2019/035828
§ 371 (c)(1),
(2) Date: Apr. 13, 2021

(87) PCT Pub. No.: WO2020/079999
PCT Pub. Date: Apr. 23, 2020

(65) Prior Publication Data
US 2022/0134890 A1    May 5, 2022

(30) Foreign Application Priority Data

Oct. 15, 2018   (JP) .............................. JP2018-194523

(51) Int. Cl.
*B60L 15/02*     (2006.01)
*H02P 21/30*     (2016.01)
(Continued)

(52) U.S. Cl.
CPC ............ *B60L 15/025* (2013.01); *B60L 15/20* (2013.01); *H02K 7/003* (2013.01); *H02P 21/30* (2016.02);
(Continued)

(58) Field of Classification Search
CPC .......... B60L 9/18; B60L 15/20; B60L 15/025; H02P 5/408; H02P 21/30; H02P 27/12; H02K 7/003
See application file for complete search history.

(56) References Cited

U.S. PATENT DOCUMENTS 8,508,162 B2     8/2013  Choi et al.
10,017,075 B2 *  7/2018  Li ........................ B60L 15/025
(Continued)

FOREIGN PATENT DOCUMENTS

JP       H05-130710 A      5/1993
JP       2000-293234 A    10/2000
(Continued)

OTHER PUBLICATIONS

Office Action issued in Indian Patent Application No. 202117017247, dated Feb. 9, 2022.
(Continued)

*Primary Examiner* — Said Bouziane
(74) *Attorney, Agent, or Firm* — Foley & Lardner LLP

(57) ABSTRACT

A motor drive device includes a power conversion circuit that drives an AC motor and a controller that controls the power conversion circuit. The controller includes a command current calculation unit generating a command current according to command torque for the AC motor and a current control unit that performs feedback control for adjusting a current applied to the AC motor to the command current. The controller also includes a control gain setting unit that calculates a control gain used for the feedback control based on the command torque and sets the calculated control gain in the current control unit. The control gain setting unit performs control such that a time from a decrease of an absolute value of the command torque to switching of the control gain is longer than a time from an increase of the absolute value of the command torque to switching of the control gain.

11 Claims, 11 Drawing Sheets

(51) Int. Cl.
*B60L 15/20* (2006.01)
*H02K 7/00* (2006.01)
*H02P 27/12* (2006.01)

(52) U.S. Cl.
CPC ......... *H02P 27/12* (2013.01); *B60L 2240/421* (2013.01); *B60L 2240/423* (2013.01); *B60L 2240/529* (2013.01)

(56) References Cited

U.S. PATENT DOCUMENTS

2009/0284195 A1    11/2009  Gallegos-Lopez
2019/0389317 A1*  12/2019  Oh .......................... B60L 15/20

FOREIGN PATENT DOCUMENTS

JP        2012-085485 A    4/2012
WO   WO-2017/085853 A1   5/2017

OTHER PUBLICATIONS

International Search Report with English translation and Written Opinion issued in corresponding application No. PCT/JP2019/035828 dated Dec. 24, 2019.

\* cited by examiner

MOTOR DRIVE DEVICE AND ELECTRIC VEHICLE SYSTEM

TECHNICAL FIELD

The present invention relates to a motor drive device that operates a motor (electric motor), and more particularly to a motor drive device and a motor vehicle system that perform feedback control for adjusting a current applied to a motor to a command current.

BACKGROUND ART

The current control of a motor drive device can be constructed by feedback control in which a current applied to a motor is detected and the detected current is adjusted to a command current. In general feedback control, proportional control or integral control is performed based on a result of multiplying a difference between the detected current and the command current by a control gain. A time until the current applied to the motor is adjusted to the command current, that is, a control response speed is adjusted by a set value of the control gain.

In the feedback control, high-speed response of control can be realized by setting a high control gain. However, if a high control gain is uniformly set regardless of control states, the control is likely to become unstable due to a setting error of a motor parameter or restrictions on a current and a voltage.

For this reason, a method of switching a control gain of feedback control according to a control state of a motor is proposed (see, for example, PTL 1). In the method of switching the control gain according to PTL 1, a motor drive device that performs position control determines a stop state, an acceleration/deceleration state, and a constant speed state of the motor based on a command signal, and switches the control gain according to the determined control state.

The switching method according to PTL 1 is applied to the motor drive device that performs the position control, but can also be applied to a motor drive device that performs torque control. In this case, the control state is determined to switch the control gain based on command torque which is the command signal. For example, the control state is divided into a small torque command state, a medium torque command state, and a large torque command state according to the magnitude of the command torque, and the control gain corresponding to the control state is switched based on the magnitude of the command torque.

CITATION LIST

Patent Literature

PTL 1: JP 2000-293234 A

SUMMARY OF INVENTION

Technical Problem

Meanwhile, in the case of the motor drive device that performs the torque control, a high control gain is set in a low torque range, and a low control gain is set in a high torque range in consideration of restrictions on a voltage and a current. Here, in a specific situation such as a case of detecting an abnormality, a situation where the command torque is set to 0 Nm at an early stage is assumed. In this case, in the switching method described in PTL 1, the control gain is set according to the magnitude (target value) of the command torque when the command torque rises, but a high control gain corresponding to 0 Nm is uniformly set regardless of a current torque level when the command torque falls. Therefore, there is a possibility that vibration, overshoot, and undershoot of motor torque occur during a transient response.

The present invention has been made to solve the above problems, and an object thereof is to provide a motor drive device and a motor vehicle system capable of avoiding deterioration of control stability of motor torque during a transient response.

Solution to Problem

A motor drive device according to one aspect of the present invention is a motor drive device, which controls torque of a motor, including: a power conversion circuit that drives the motor; and a controller that controls the power conversion circuit. The controller includes: a command current calculation unit that generates a command current according to command torque for the motor; a current control unit that performs feedback control for adjusting a current applied to the motor to the command current; and a control gain setting unit that calculates a control gain used for the feedback control based on the command torque and sets the calculated control gain in the current control unit. The control gain setting unit performs control such that a time from a decrease of an absolute value of the command torque to switching of the control gain is longer than a time from an increase of the absolute value of the command torque to switching of the control gain.

Advantageous Effects of Invention

According to the present invention, the time from the decrease of the absolute value of the command torque to the switching of the control gain is longer than the time from the increase of the absolute value of the command torque to the switching of the control gain. Thus, the control gain at the rising time of the absolute value of the command torque can also be applied at the falling time of the absolute value of the command torque. Accordingly, a stable operation of the motor torque can be realized while suppressing the vibration, overshoot, undershoot, and the like of the motor torque during the transient response.

DESCRIPTION OF EMBODIMENTS

Figure 1:
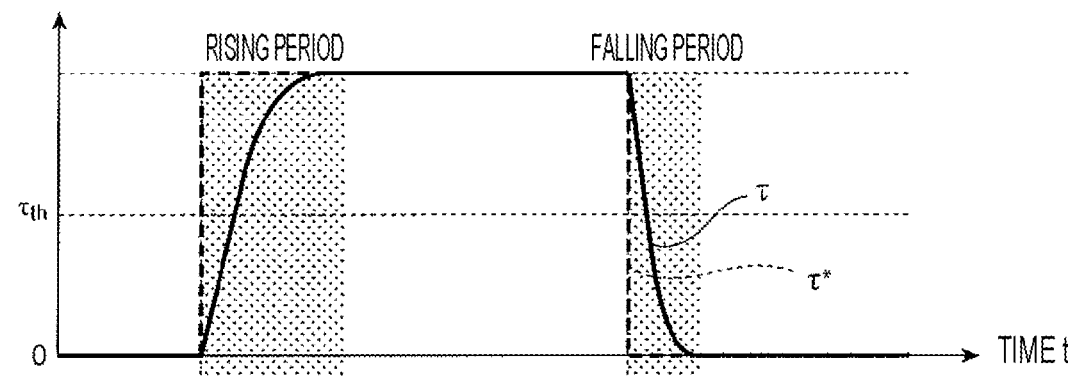
FIG. 1 is a conceptual waveform diagram of a control gain switching operation of a comparative example.
Figure 1:
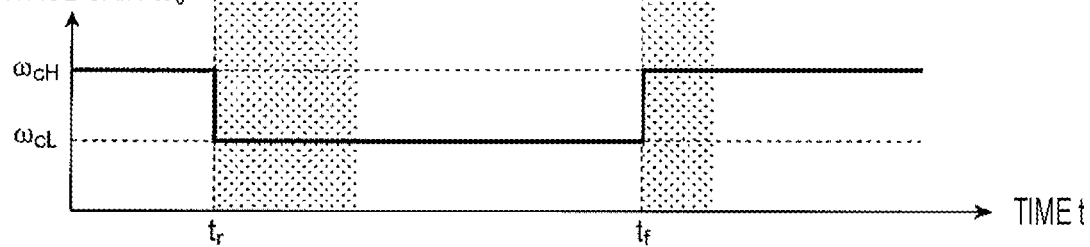

A control gain switching operation according to a comparative example will be described before describing a control gain switching operation according to the present embodiment. FIG. 1 is a conceptual waveform diagram of the control gain switching operation according to the comparative example.

As illustrated in FIG. 1, a control state is determined based on whether or not command torque $\tau^*$ exceeds a threshold $\tau_{th}$ in the control gain switching operation according to the comparative example. When the control state is determined based on the command torque $\tau^*$, a control gain $\omega_c$ is switched at the same time as the state determination. In this case, a low control gain $\omega_{cL}$ is set as the control gain $\omega_c$ if it is determined that the command torque $\tau^*$ exceeds the threshold $\tau_{th}$, and a high control gain $\omega_{cH}$ is set as the control gain $\omega_c$ if it is determined that the command torque $\tau^*$ falls below the threshold $\tau_{th}$.

At "$t=t_r$", when the command torque $\tau^*$ increases in steps and changes across the threshold $\tau_{th}$, the setting of the control gain $\omega_c$ immediately switches from the high control gain $\omega_{cH}$ to the low control gain $\omega_{cL}$. Therefore, the low control gain $\omega_{cL}$ is set as the control gain $\omega_c$ in a rising period of the motor torque $\tau$ immediately after a lapse of $t_r$.

Thereafter, at "$t=t_f$", when the command torque $\tau^*$ decreases in steps and changes across the threshold $\tau_{th}$, the setting of the control gain $\omega_c$ immediately switches from the low control gain $\omega_{cL}$ to the high control gain $\omega_{cH}$. Therefore, the high control gain $\omega_{cH}$ is set as the control gain $\omega_c$ in a falling period of the motor torque $\tau$ immediately after the lapse of $t_f$.

In this manner, when the binary command torque $\tau^*$ moves back and forth in steps, different control gains are set at the rising time and falling time of the command torque $\tau^*$ in the control gain switching operation according to the comparative example. In particular, the high control gain $\omega_{cH}$ is set when the command torque $\tau^*$ falls in the operation illustrated in FIG. 1, and thus, there is a possibility that vibration, undershoot, and the like of the motor torque occurs during a transient response (falling period). Here, an example in which the command torque $\tau^*$ changes in steps is illustrated, but there is a possibility that the same problem occurs even when the command torque $\tau^*$ changes abruptly. Therefore, the same control gain is set at the rising time and the falling time of the command torque $\tau^*$ in the control gain switching operation of the present embodiment.

First Embodiment

Figure 2:
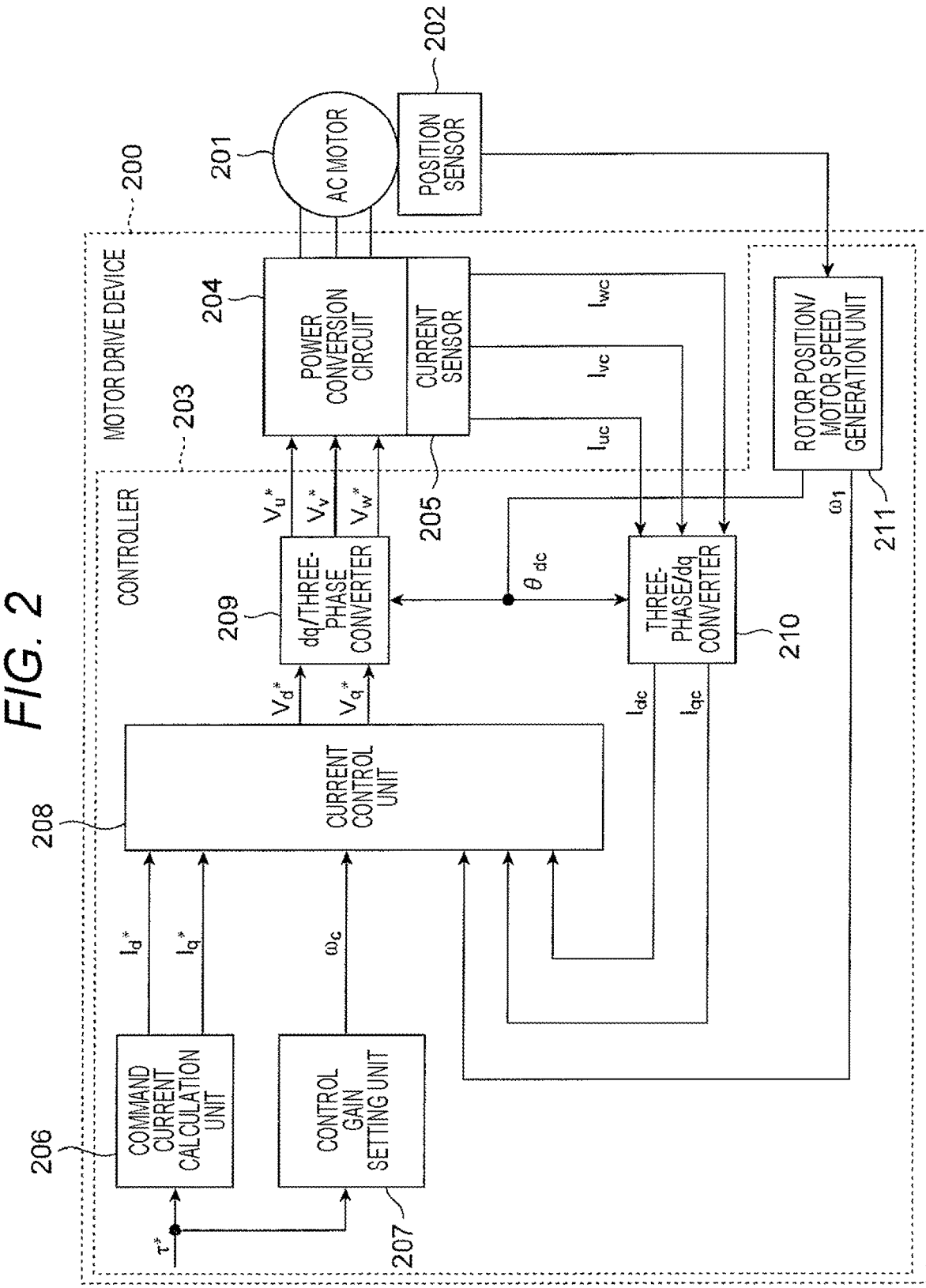
FIG. 2 is a configuration diagram of a motor drive device according to a first embodiment.

Hereinafter, a motor drive device 200 to which the control gain switching operation according to the present embodiment is applied will be described. FIG. 2 is a configuration diagram of a motor drive device 200 according to a first embodiment.

As illustrated in FIG. 2, the motor drive device 200 according to the present embodiment controls torque of an AC motor (motor) 201, and includes a power conversion circuit 204 that drives the AC motor 201 and a controller 203 that controls the power conversion circuit 204. The AC motor 201 is provided with a position sensor 202, and the power conversion circuit 204 is provided with a current sensor 205. The AC motor 201 is, for example, a three-phase brushless DC motor. Further, the position sensor 202 is, for example, an encoder or a resolver, and outputs a signal corresponding to the rotation of a rotor.

The controller 203 has a basic configuration of vector control, receives the command torque $\tau^*$ as an input from the outside, and outputs three-phase command voltages $V_u^*$, $V_v^*$, and $V_w^*$ to the power conversion circuit 204. The power conversion circuit 204 drives the AC motor 201 based on the three-phase command voltages $V_u^*$, $V_v^*$, and $V_w^*$ output from the controller 203. The current sensor 205 detects a current applied to the AC motor 201 and feeds back three-phase actual currents $I_{uc}$, $I_{vc}$, and $I_{wc}$, which are detected current values, to the controller 203.

Further, the controller 203 includes a command current calculation unit 206, a control gain setting unit 207, a current control unit 208, a dq/three-phase converter 209, a three-phase/dq converter 210, and a rotor position/motor speed generation unit 211. Note that each part of the controller 203 is configured using a processor, an integrated circuit, a memory, and the like that execute various processes. The memory is configured using one or a plurality of recording media such as a read only memory (ROM) and a random access memory (RAM) depending on an application. Although a description is given assuming that each part of the controller 203 mainly executes various processes in the following description, the processor executes the various processes in cooperation with the memory and the like in reality.

The command current calculation unit 206 calculates a d-axis command current $I_d^*$ and a q-axis command current $I_q^*$ according to the command torque $\tau^*$ for the AC motor 201, and outputs the calculated d-axis command current $I_d^*$ and q-axis command current $I_q^*$ to the current control unit 208. The command current calculation unit 206 is configured using, for example, a look-up table in which the d-axis command current $I_d^*$ and the q-axis command current $I_q^*$ are associated with the command torque $\tau^*$.

The control gain setting unit 207 calculates the control gain $\omega_c$ used for feedback control based on the command torque $\tau^*$ and sets the calculated control gain $\omega_c$ in the current control unit 208. In this case, the control gain setting unit 207 outputs the control gain $\omega_c$ according to the command torque $\tau^*$ to the current control unit 208 after a lapse of a predetermined set time. This control gain $\omega_c$ is a variable control gain that changes based on the command torque $\tau^*$. Note that a detailed configuration of the control gain setting unit 207 will be described later.

The current control unit 208 is configured to perform the feedback control for adjusting a current applied to the AC motor 201 to a command current. The d-axis command current $I_d^*$ and q-axis command current $I_q^*$ from the command current calculation unit 206, and the control gain $\omega_c$ from the control gain setting unit 207 are input to the current control unit 208. Further, to the current control unit 208, a d-axis actual current $I_{dc}$ and a q-axis actual current $I_{qc}$ are fed back from the current sensor 205 through the three-phase/dq converter 210, and a motor speed $\omega_1$ is fed back from the position sensor 202 through the rotor position/motor speed generation unit 211. The current control unit 208 calculates a d-axis command voltage $V_d^*$ and a q-axis command voltage $V_q^*$ based on the inputs from each of these parts, and outputs the calculated d-axis command voltage $V_d^*$ and q-axis command voltage $V_q^*$ to the dq/three-phase converter 209. Note that a detailed configuration of the current control unit 208 will be described later.

The dq/three-phase converter 209 converts the d-axis command voltage $V_d^*$ and q-axis command voltage $V_q^*$ input from the current control unit 208 into the three-phase command voltages $V_u^*$, $V_v^*$, and $V_w^*$ based on a rotor position $\theta_{dc}$ input from the rotor position/motor speed generation unit 211. The AC motor 201 is driven by the three-phase command voltages $V_u^*$, $V_v^*$, and $V_w^*$ via the power conversion circuit 204.

The three-phase/dq converter 210 converts the three-phase actual currents $I_{uc}$, $I_{vc}$, and $I_{wc}$ detected by the current sensor 205 into the d-axis actual current $I_{dc}$ and the q-axis actual current $I_{qc}$ based on the rotor position $\theta_{dc}$ input from the rotor position/motor speed generation unit 211.

The rotor position/motor speed generation unit 211 generates the motor speed $\omega_1$ and the rotor position $\theta_{dc}$ from an output signal of the position sensor 202 provided in the AC motor 201.

Figure 3:
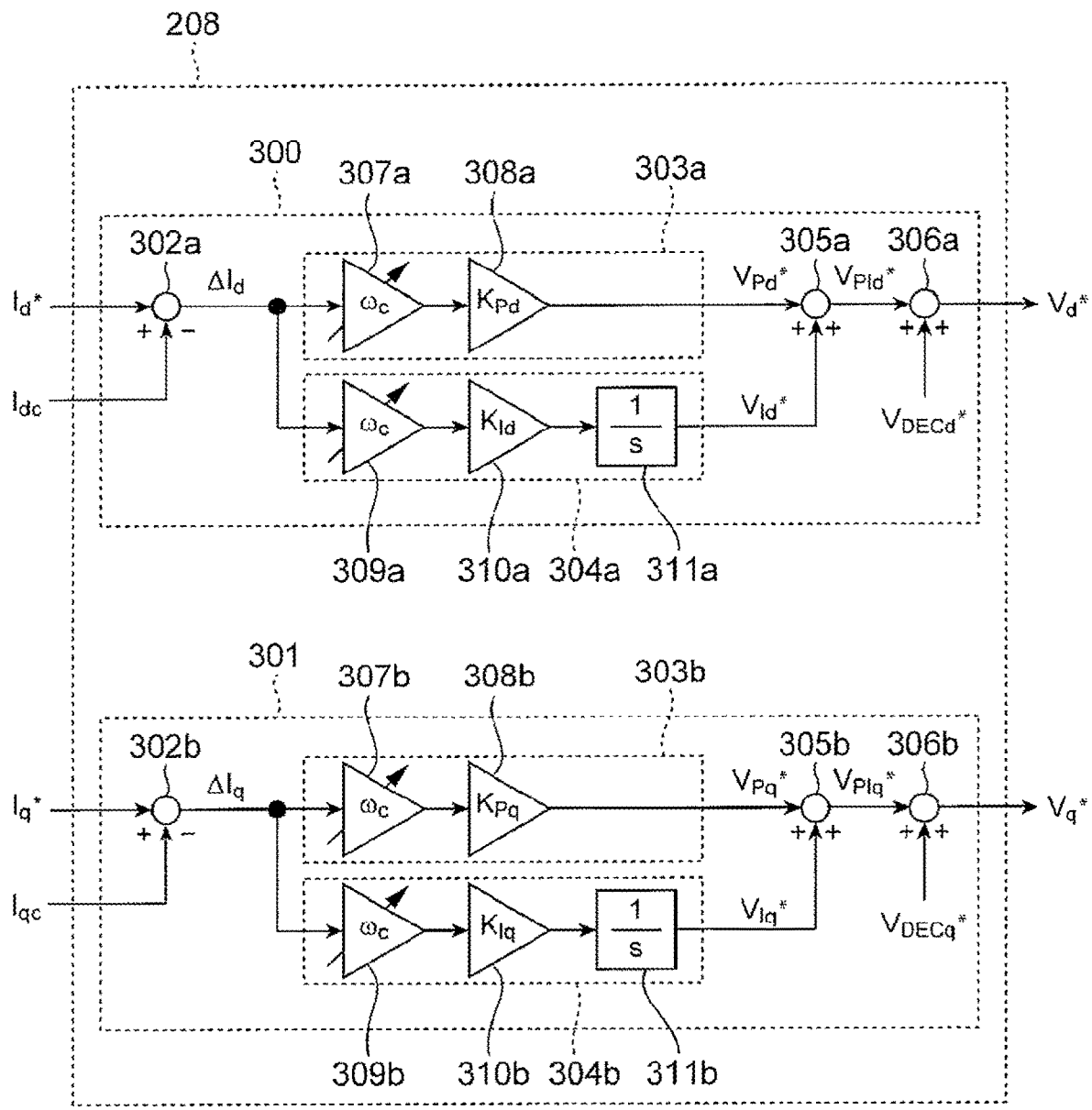
FIG. 3 is a configuration diagram of a current control unit according to the first embodiment.

A detailed configuration of the current control unit 208 will be described with reference to FIG. 3. FIG. 3 is a configuration diagram of the current control unit 208 according to the first embodiment.

As illustrated in FIG. 3, the current control unit 208 includes a d-axis current control unit 300 and a q-axis current control unit 301. The d-axis current control unit 300 controls the d-axis actual current $I_{dc}$ input from the three-phase/dq converter 210 (see FIG. 2) to approximate to the d-axis command current $I_d^*$ input from the command current calculation unit 206 (see FIG. 2) by PI control. The q-axis current control unit 301 controls the q-axis actual current $I_{qc}$ input from the three-phase/dq converter 210 to approximate to the q-axis command current $I_q^*$ input from the command current calculation unit 206 by PI control.

The d-axis current control unit 300 includes a subtraction unit 302a, a P (proportional) control unit 303a, an I (integral) control unit 304a, an addition unit 305a, and an addition unit 306a.

In the subtraction unit 302a, a d-axis current deviation $\Delta I_d$ is calculated from the d-axis command current $I_d^*$ input from the command current calculation unit 206 and the d-axis actual current $I_{dc}$ input from the three-phase/dq converter 210 based on the following Formula (1).

$$\Delta I_d = I_d^* - I_{dc} \quad (1)$$

The P control unit 303a includes a control gain multiplication unit 307a and a control gain multiplication unit 308a. The variable control gain $\omega_c$ input from the control gain setting unit 207 (see FIG. 2) is set in the control gain multiplication unit 307a, and a d-axis P control gain $K_{Pd}$ is set in the control gain multiplication unit 308a. In the P control unit 303a, a d-axis P control output $V_{Pd}^*$ is calculated from the d-axis current deviation $\Delta I_d$, the variable control gain $\omega_c$ and the d-axis P control gain $K_{Pd}$ based on the following Formula (2).

$$V_{Pd}^* = \omega_c \cdot K_{Pd} \cdot \Delta I_d \quad (2)$$

Note that the d-axis current deviation $\Delta I_d$ is multiplied by the variable control gain $\omega_c$ in the control gain multiplication unit 307a and the d-axis P control gain $K_{Pd}$, which is a constant value, in the control gain multiplication unit 308a, in the present embodiment.

The I control unit 304a includes a control gain multiplication unit 309a, a control gain multiplication unit 310a, and an integrator 311a. The variable control gain $\omega_c$ input from the control gain setting unit 207 is set in the control gain multiplication unit 309a, and a d-axis I control gain $K_{Id}$ is set in the control gain multiplication unit 310a. In the I control unit 304a, a d-axis I control output $V_{Id}^*$ is calculated from the d-axis current deviation $\Delta I_d$, the variable control gain $\omega_c$, and the d-axis I control gain $K_{Id}$ based on the following Formula (3).

$$V_{Id}^* = \omega_c \cdot K_{Id} \cdot \int \Delta I_d \, dt \quad (3)$$

Note that, in the present embodiment, the d-axis current deviation $\Delta I_d$ is multiplied by the variable control gain $\omega_c$ in the control gain multiplication unit 309a and the d-axis I control gain $K_{Id}$, which is a constant value, in the control gain multiplication unit 310a, and the integration is performed in the integrator 311a.

In the addition unit 305a, the d-axis P control output $V_{Pd}^*$ input from the P control unit 303a and the d-axis I control output $V_{Id}^*$ input from the I control unit 304a are added to output a d-axis PI control output $V_{PId}^*$ ($=V_{Pd}^* + V_{Id}^*$).

In the addition unit 306a, the d-axis PI control output $V_{PId}^*$ input from the addition unit 305a and a d-axis non-interference control output $V_{DECd}^*$ are added to output the d-axis command voltage $V_d^*$ ($=V_{PId}^* + V_{DECd}^*$). The d-axis non-interference control output $V_{DECd}^*$ can be obtained from the motor speed $\omega_1$, a q-axis inductance $L_{qc}$, and the q-axis actual current $I_{qc}$ from, for example, calculation of the following Formula (4).

$$V_{DECd}^* = -\omega_1 \cdot L_{qc} \cdot I_{qc} \quad (4)$$

Note that the q-axis actual current $I_{qc}$ is used for the calculation of Formula (4) in the present embodiment, but the q-axis command current $I_q^*$ or the q-axis I control output $V_{Iq}^*$ may be used instead of the q-axis actual current $I_{qc}$.

The q-axis current control unit 301 includes a subtraction unit 302b, a P control unit 303b, an I control unit 304b, an addition unit 305b, and an addition unit 306b.

In the subtraction unit 302b, a q-axis current deviation $\Delta I_q$ is calculated from the q-axis command current $I_q^*$ input from the command current calculation unit 206 and the q-axis actual current $I_{qc}$ input from the three-phase/dq converter 210 based on the following Formula (5).

$$\Delta I_q = I_q^* - I_{qc} \quad (5)$$

The P control unit 303b includes a control gain multiplication unit 307b and a control gain multiplication unit 308b. The variable control gain $\omega_c$ input from the control gain setting unit 207 is set in the control gain multiplication unit 307b, and a q-axis P control gain $K_{Pq}$ is set in the control gain multiplication unit 308b. In the P control unit 303b, a q-axis P control output $V_{Pq}^*$ is calculated from the q-axis current deviation $\Delta I_q$, the variable control gain $\omega_c$, and the q-axis P control gain $K_{Pq}$ based on the following Formula (6).

$$V_{Pq}^* = \omega_c \cdot K_{Pq} \cdot \Delta I_q \quad (6)$$

Note that the q-axis current deviation $\Delta I_q$ is multiplied by the variable control gain $\omega_c$ in the control gain multiplication unit 307b and the q-axis P control gain $K_{Pq}$ which is a constant value, in the control gain multiplication unit 308b, in the present embodiment.

The I control unit 304b includes a control gain multiplication unit 309b, a control gain multiplication unit 310b, and an integrator 311b. The variable control gain $\omega_c$ input from the control gain setting unit 207 is set in the control gain multiplication unit 309b, and a q-axis I control gain $K_{Iq}$ is set in the control gain multiplication unit 310b. In the I control unit 304b, the a-axis I control output $V_{Iq}^*$ is calculated from the q-axis current deviation $\Delta I_q$, the variable control gain $\omega_c$, and the q-axis control gain $K_{Iq}$ based on the following Formula (7).

$$V_{Iq}^* = \omega_c \cdot K_{Iq} \cdot \int \Delta I_q dt \tag{7}$$

Note that, in the present embodiment, the q-axis current deviation $\Delta I_q$ is multiplied by the variable control gain $\omega_c$ in the control gain multiplication unit 309b and the q-axis I control gain $K_{Iq}$, which is a constant value, in the control gain multiplication unit 310b, and the integration is performed by the integrator 311b.

In the addition unit 305b, the q-axis P control output $V_{Pq}^*$ input from the P control unit 303b and the q-axis I control output $V_{Iq}^*$ input from the I control unit 304b are added to output a q-axis PI control output $V_{PIq}^*$ $(=V_{Pq}^* + V_{Iq}^*)$.

In the addition unit 306b, the q-axis PI control output $V_{PIq}^*$ input from the addition unit 305b and a q-axis non-interference control output $V_{DECq}^*$ are added to output the q-axis command voltage $V_q^*$ $(=V_{PIq}^* + V_{DECq}^*)$. The q-axis non-interference control output $V_{DECq}^*$ can be obtained from the motor speed $\omega_1$, a d-axis inductance $L_{dc}$, the d-axis actual current $I_{dc}$, and an induced voltage constant $K_{Ec}$, for example, from calculation of the following Formula (8).

$$V_{DECq}^* = \omega_1 \cdot L_{dc} \cdot I_{dc} + \omega_1 \cdot K_{Ec} \tag{8}$$

Note that the d-axis actual current $I_{dc}$ is used for the calculation of Formula (8) in the present embodiment, but the d-axis command current $I_d^*$ or the d-axis I control output $V_{Id}^*$ may be used instead of the d-axis actual current $I_{dc}$.

As described above, the current control unit 208 sets the control gain $\omega_c$ that changes based on the command torque $\tau^*$ in the P control units 303a and 303b and the I control units 304a and 304b, thereby forming the motor drive device capable of switching a control response speed according to a control state.

Figure 4:
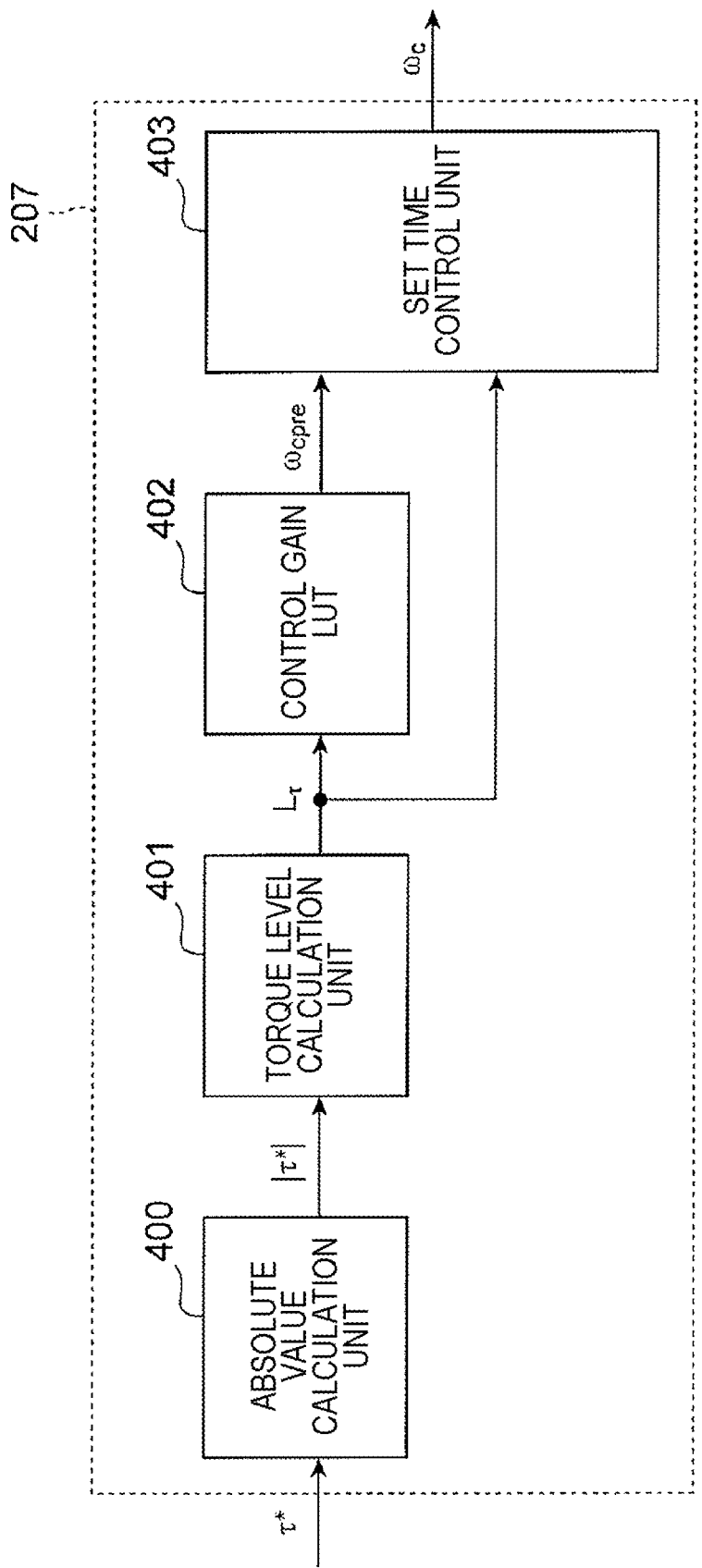
FIG. 4 is a configuration diagram of a control gain setting unit according to the first embodiment.
Figures 5, 6:
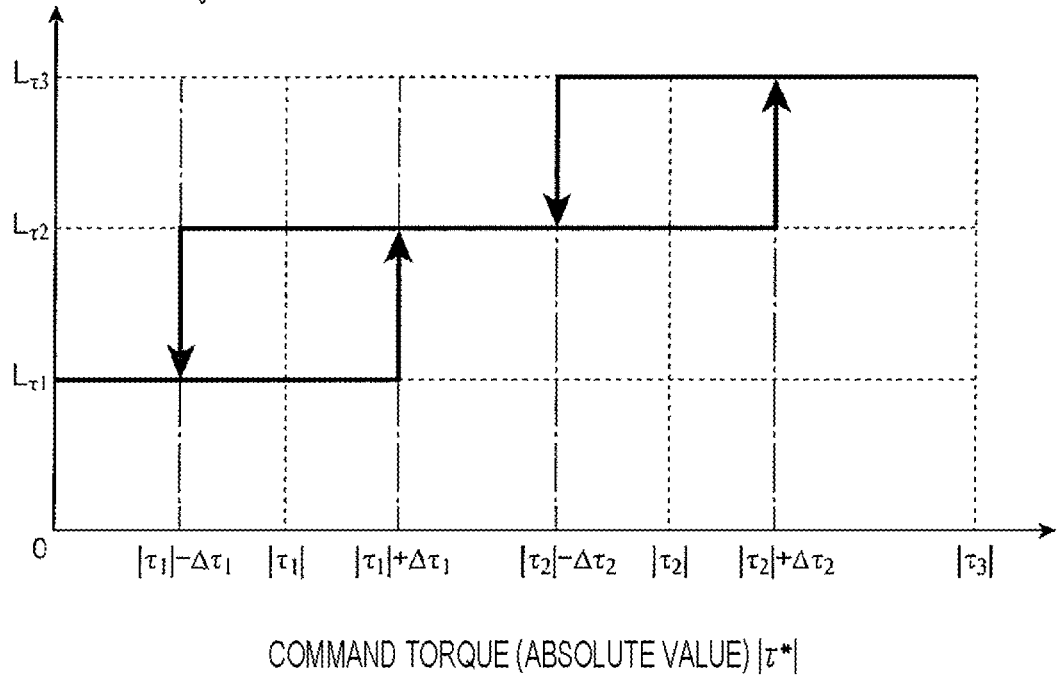
FIG. 5 is a conceptual diagram of an operation of a torque level calculation unit according to the first embodiment.
FIG. 6 is an implementation example of a control gain LUT according to the first embodiment.

A detailed configuration of the control gain setting unit 207 will be described with reference to FIGS. 4 to 6. FIG. 4 is a configuration diagram of the control gain setting unit 207 according to the first embodiment. FIG. 5 is an operation conceptual diagram of a torque level calculation unit 401 according to the first embodiment. FIG. 6 is an implementation example of a control gain LUT 402 according to the first embodiment.

As illustrated in FIG. 4, the control gain setting unit 207 includes an absolute value calculation unit 400, the torque level calculation unit 401, the control gain LUT 402, and a set time control unit 403.

The absolute value calculation unit 400 outputs an absolute value $|\tau^*|$ of the input command torque $\tau^*$. With this processing, the sign of the command torque $\tau^*$ is ignored, and operations during power running and regeneration are similarly treated.

The torque level calculation unit 401 converts the absolute value $|\tau^*|$ of the command torque into a predetermined torque level value $L_\tau$. Here, the conversion process from the absolute value $|\tau^*|$ of the command torque to the torque level value will be described. FIG. 5 illustrates an operation example when the absolute value $|\tau^*|$ of the command torque that changes in a range of 0 to $|\tau_3|$ is converted into the torque level values $L_\tau$ in three steps of $L_{\tau 1}$, $L_{\tau 2}$, and $L_{\tau 3}$ in the torque level calculation unit 401.

When a hysteresis characteristic is applied to the torque level calculation unit 401 as illustrated in FIG. 5, the operation differs depending on whether the absolute value $|\tau^*|$ of the command torque increases or decreases. When the absolute value $|\tau^*|$ of the command torque increases, the torque level value changes from $L_{\tau 1}$ to $L_{\tau 2}$ at $|\tau_1| + \Delta\tau_1$, and the torque level value changes from $L_{\tau 2}$ to $L_{\tau 3}$ at $|\tau_2| + \Delta\tau_2$. On the other hand, when the absolute value $|\tau^*|$ of the command torque decreases, the torque level value changes from $L_{\tau 2}$ to $L_{\tau 1}$ at $|\tau_1| - \Delta\tau_1$, and the torque level value changes from $L_{\tau 3}$ to $L_{\tau 2}$ at $|\tau_2| - \Delta\tau_2$.

In this manner, the torque level calculation unit 401 applies the hysteresis characteristic to the change of the torque level value $L_\tau$ between the absolute value of the command torque decreases and increases. As a result, it is possible to suppress a frequent change of the torque level value $L_\tau$ near a threshold ($|\tau_1|$, $|\tau_2|$) at which the torque level value $L_\tau$ changes and to make the switching operation of the torque level value $L_\tau$ stable.

Note that the torque level calculation unit 401 of the present embodiment converts the absolute value $|\tau^*|$ of the command torque into the torque level values $L_\tau$ in three steps, but may be converted in the number of steps less than three steps or the number of steps more than three steps.

Further, the torque level calculation unit 401 of the present embodiment applies the hysteresis characteristic to all the thresholds ($|\tau_1|$, $|\tau_2|$), that is, the changes of the torque level values $L_\tau$ in all the steps, but is not limited to this configuration. The torque level calculation unit 401 may apply the hysteresis characteristic only to the change of the torque level value $L_\tau$ in some steps, or does not necessarily apply the hysteresis characteristic to the changes of the torque level value $L_\tau$ in all the steps.

The control gain LUT 402 is a look-up table in which a control gain $\omega_{cpre}$ is stored in association with the torque level value $L_\tau$. It should be noted that this control gain $\omega_{cpre}$ is a value read from the look-up table and is distinguished from the control gain $\omega_c$ applied to the current control unit 208.

For example, the control gain LUT 402 is implemented in the form as illustrated in FIG. 6 when the torque level calculation unit 401 converts the absolute value $|\tau^*|$ of the command torque into the torque level values $L_\tau$ in the three steps of $L_{\tau 1}$, $L_{\tau 2}$, and $L_{\tau 3}$. In this manner, the control gain setting unit 207 calculates the torque level value $L_\tau$, which is an argument of the control gain LUT 402, based on the absolute value $|\tau^*|$ of the command torque, and reads the control gain $\omega_{cpre}$ from the control gain LUT 402. Since the look-up table is used to set the control gain, it is possible to read the control gain $\omega_{cpre}$ from the torque level $L_\tau$ by a simple reference process instead of a complicated calculation process.

In the present embodiment, the control gain LUT 402 is the look-up table in which only the torque level value $L_\tau$ is used as the argument, but a more multi-dimensional look-up table may be configured by adding an argument. As the argument to be added, for example, a motor speed, a carrier frequency, and the like can be considered.

The set time control unit 403 controls a time until the control gain $\omega_{cpre}$ read from the control gain LUT 402 is set in the current control unit 208 based on the torque level value $L_\tau$. The control gain $\omega_{cpre}$ is set immediately when the torque level value $L_\tau$ increases, and the control gain $\omega_{cpre}$ is set after a lapse of a predetermined holding time $T_h$ since a decrease of the torque level value $L_\tau$ when the torque level value $L_\tau$ decreases. In this manner, the control gain setting unit 207 performs control such that a time from when the decrease of the absolute value $|\tau^*|$ of the command torque to switching of the control gain is longer than a time from an increase of the absolute value $|\tau^*|$ of the command torque to switching of the control gain in response to the increase and decreases of the torque level value $L_\tau$.

Figure 7:
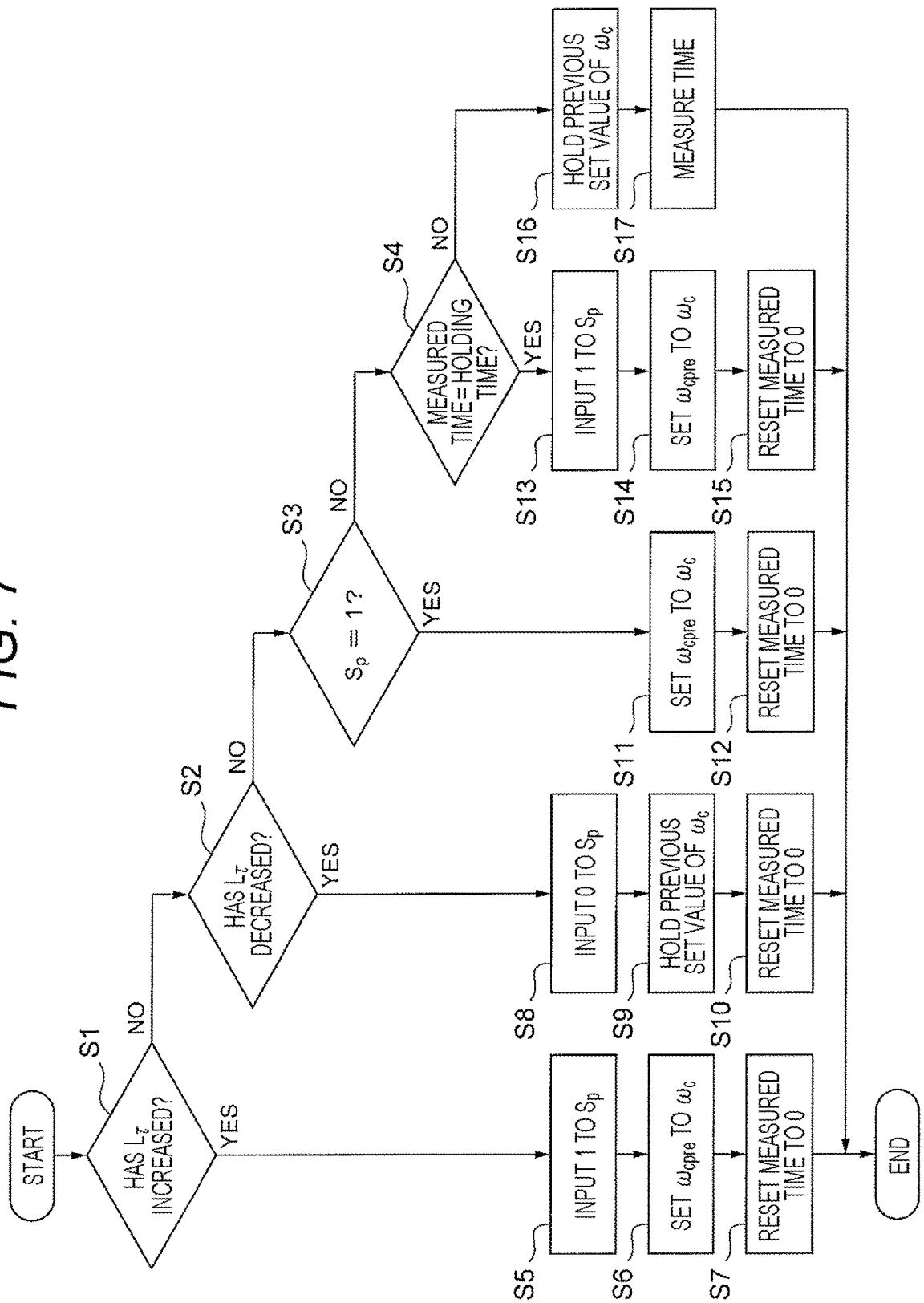
FIG. 7 is a flowchart which illustrates an operation of a set time control unit according to the first embodiment.
Figure 8:
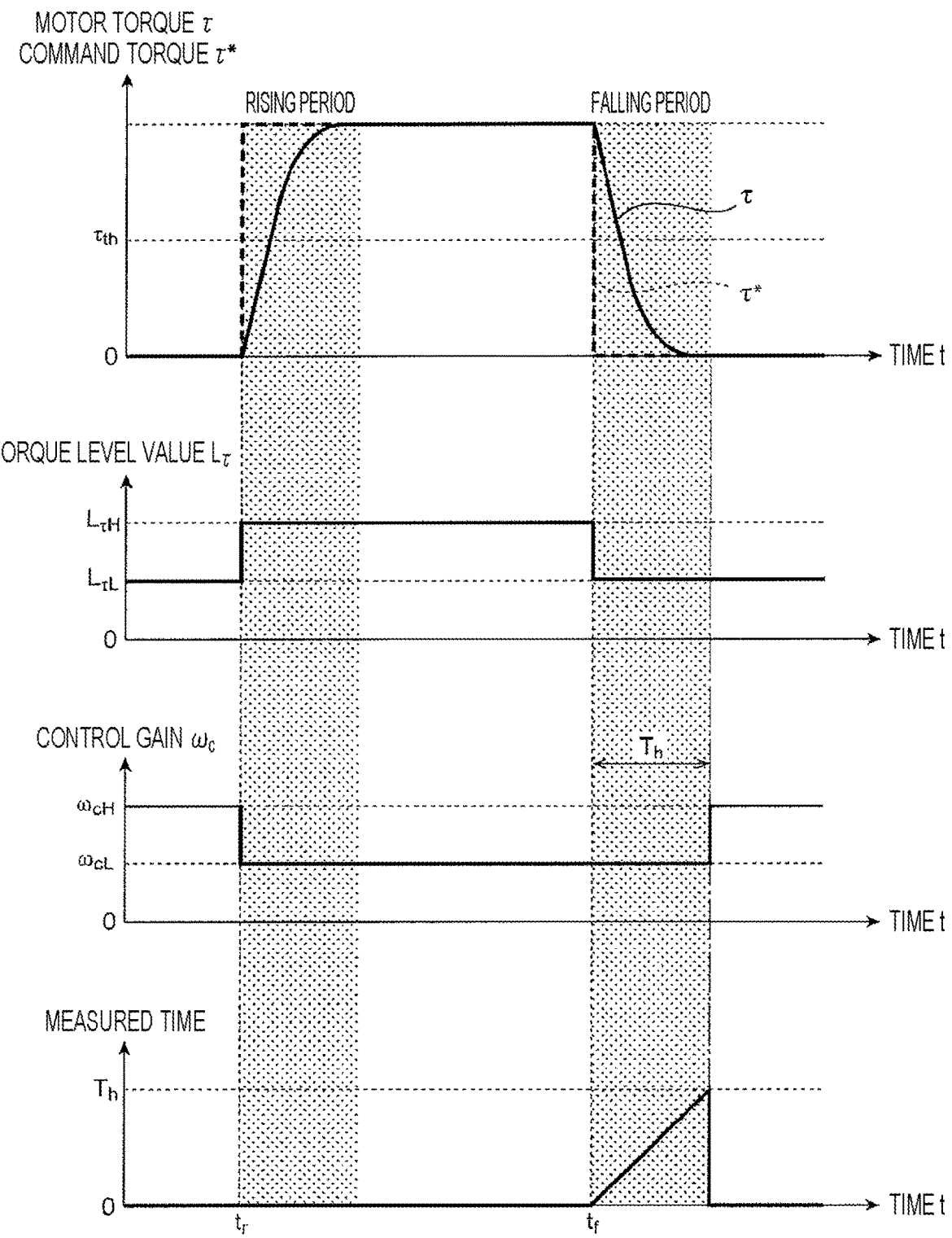
FIG. 8 is a conceptual waveform diagram of a control gain switching operation according to the first embodiment.

The control gain switching operation will be described with reference to FIGS. 7 and 8. FIG. 7 is a flowchart illustrating the operation of the set time control unit 403 according to the first embodiment. FIG. 8 is a conceptual waveform diagram of the control gain switching operation according to the first embodiment. Note that it is assumed that the process is performed every time the command torque τ* is input in the flowchart of FIG. 7. Further, the example in which the command torque τ* changes in steps is described here, but the same description is also applies when the command torque τ* changes abruptly. Furthermore, FIG. 8 illustrates a state where a torque level value changes between two torque level values $L_{\tau L}$ and $L_{\tau H}$ for convenience of the description, but an actual torque level value changes in a plurality of steps.

First, an operation flow at the start of rising of the absolute value |τ*| of the command torque of "$t=t_r$," will be described. The absolute value |τ*| of the command torque is converted into the torque level value $L_\tau$, and the set time control unit 403 (see FIG. 4) determines whether or not the torque level value $L_\tau$ has increased (Step S1). The increase of the torque level value $L_\tau$ is determined based on, for example, whether or not the absolute value |τ*| of the command torque exceeds the threshold $\tau_{th}$. At "$t=t_r$," the absolute value |τ*| of the command torque increases in steps and changes across the threshold $\tau_{th}$. Therefore, it is determined that the torque level value $L_\tau$ has increased from the torque level value $L_{\tau L}$ to the torque level value $L_{\tau H}$.

When determining that the torque level value $L_\tau$ has increased (YES in Step S1), the set time control unit 403 inputs "1" to a permission signal $S_p$ (Step S5). "$S_p=1$" means a "state where the control gain $\omega_{cpre}$ read from the control gain LUT 402 (see FIG. 4) can be immediately set in the current control unit 208 as the control gain $\omega_c$". The set time control unit 403 sets the control gain $\omega_{cpre}$ read from the control gain LUT 402 as the control gain $\omega_c$ (Step S6). Here, the control gain $\omega_{cL}$ corresponding to the torque level value $L_{\tau H}$ is immediately set in the current control unit 208. Then, the set time control unit 403 resets the measured time to "0" (Step S7). At the start of rising of the absolute value |τ*| of the command torque, the processes of Steps S1 and S5 to S7 are performed.

Next, an operation flow when the absolute value |τ*| of the command torque is maintained at a constant value immediately after the lapse of $t_r$ will be described. The set time control unit 403 determines whether or not the torque level value $L_\tau$ has increased (Step S1) and whether or not the torque level value $L_\tau$ has decreased (Step S2). The decrease of the torque level value $L_\tau$ is determined based on, for example, whether or not the absolute value |τ*| of the command torque falls below the threshold $\tau_{th}$. Immediately after the lapse of $t_r$, the absolute value |τ*| of the command torque does not change across the threshold $\tau_{th}$. Therefore, it is determined that the torque level value $L_\tau$ has not increased or decreased from the torque level value $L_{\tau H}$.

When determining that the torque level value $L_\tau$ has not increased or decreased (NO in Steps S1 and S2), the set time control unit 403 determines whether or not "1" has been input to the permission signal $S_p$ (Step S3). When "1" has been input to the permission signal $S_p$ (YES in Step S3), the set time control unit 403 sets the control gain $\omega_{cpre}$ read from the control gain LUT 402 as the control gain $\omega_c$ (Step S11). Here, the control gain $\omega_{cL}$ corresponding to the torque level value $L_{\tau H}$ is set in the current control unit 208. Then, the set time control unit 403 resets the measured time to "0" (Step S12). The processes of Steps S1 to S3, S11, and S12 are performed while the absolute value |τ*| of the command torque is maintained at a constant value immediately after the lapse of $t_r$.

Next, an operation flow at the start of falling of the absolute value |τ*| of the command torque of "$t=t_f$" will be described. The set time control unit 403 determines whether or not the torque level value $L_\tau$ has increased (Step S1) and whether or not the torque level value $L_\tau$ has decreased (Step S2). At "$t=t_f$", the absolute value |τ*| of the command torque decreases in steps and changes across the threshold $\tau_{th}$. Therefore, it is determined that the torque level value $L_\tau$ has decreased from the torque level value LTH to the torque level value $L_{\tau L}$.

When determining that the torque level value $L_\tau$ has decreased (NO in Step S1 and YES in Step S2), the set time control unit 403 inputs "0" to the permission signal $S_p$ (Step S8).

"$S_p=0$" means a "state where a previously set value of the control gain $\omega_c$ is held".

The set time control unit 403 holds the previously set value of the control gain $\omega_c$ (Step S9). Here, the torque level value $L_{\tau L}$ is set, but the control gain $\omega_{cL}$, which is the previously set value, is set in the current control unit 208 for the control gain $\omega_c$. Then, the set time control unit 403 resets the measured time to "0" (Step S10). At the start of falling of the absolute value |τ*| of the command torque, the processes of Steps S1, S2, and S8 to S10 are performed.

Next, an operation flow when the absolute value |τ*| of the command torque is maintained at a constant value immediately after a lapse of $t_f$ will be described. The set time control unit 403 determines whether or not the torque level value $L_\tau$ has increased (Step S1) and whether or not the torque level value $L_\tau$ has decreased (Step S2). Immediately after the lapse of $t_f$, the absolute value |τ*| of the command torque does not change across the threshold $\tau_{th}$. Therefore, it is determined that the torque level value $L_\tau$ has not increased or decreased from the torque level value $L_{\tau L}$.

When determining that the torque level value $L_\tau$ has not increased or decreased (NO in Steps S1 and S2), the set time control unit 403 determines whether or not "1" has been input to the permission signal $S_p$ (Step S3). Since "0" has been input to the permission signal $S_p$ at "$t=t_f$" (NO in Step S3), the set time control unit 403 determines whether or not the measured time is the predetermined holding time $T_h$ (Step S4). If the predetermined holding time $T_h$ has not elapsed immediately after the lapse of $t_f$ (NO in Step S4), the set time control unit 403 holds the previously set value of the control gain $\omega_c$ (Step S16). Here, the torque level value $L_{\tau L}$ is set, but the control gain $\omega_{cL}$, which is the previously set value, is set in the current control unit 208 for the control gain $\omega_c$. Then, the set time control unit 403 measures the time (Step S17).

The set time control unit 403 repeats the processes of Steps S1 to S4, S16, and S17 until the predetermined holding time $T_h$ elapses immediately after the lapse of $t_f$. That is, the setting of the control gain $\omega_{cL}$ is continued until the predetermined holding time $T_h$, which is the falling period of the motor torque, elapses. As the control gain $\omega_c$ is held until the lapse of the holding time $T_h$, it is possible to avoid immediate switching of the control gain $\omega_c$ at the falling time of the absolute value |τ*| of the command torque.

When the predetermined holding time $T_h$ elapses immediately after the lapse of $t_f$ (YES in Step S4), the set time control unit 403 inputs "1" to the permission signal $S_p$ (Step S13). The set time control unit 403 sets the control gain $\omega_{cpre}$ read from the control gain LUT 402 as the control gain $\omega_c$ (Step S14). Here, the control gain $\omega_{cH}$ corresponding to the torque level value $L_{\tau L}$ is set in the current control unit 208. Then, the set time control unit 403 resets the measured time to "0" (Step S15). The processes of Steps S1 to S4 and S13 to S17 are performed while the absolute value |τ*| of the command torque is maintained at a constant value immediately after the lapse of $t_f$.

In this manner, the control gain $\omega_{cpre}$ calculated from the control gain LUT 402 is immediately set in the current control unit 208 at the rising time when the absolute value |τ*| of the command torque increases. Further, the control gain $\omega_{cpre}$ calculated from the control gain LUT 402 is set in the current control unit 208 with a delay of the predetermined holding time $T_h$ at the falling time when the absolute value |τ*| of the command torque decreases. As a result, the same control gain $\omega_c$ can be set for the current control unit 208 at the rising time and the falling time of the absolute value |τ*| of the command torque.

The predetermined holding time $T_h$ is a time estimated by the controller 203 as a transition time from a transient response state to a steady state of the motor torque. Since it is difficult to detect the motor torque and observe the state, for example, a time required for the d-axis actual current $I_{dc}$ and the q-axis actual current $I_{qc}$ to reach 90% of the d-axis command current $I_d^*$ and the q-axis command current $I_q^*$, respectively, may be obtained from the following Formula (9) and set as the holding time $T_h$.

$$T_h = 2.197/\omega_c \qquad (9)$$

Note that it suffices that the holding time $T_h$ is set to a time required for the motor torque τ to be adjusted to the command torque τ*, and is not limited to the time obtained by Formula (9). It suffices that the holding time $T_h$ is set to such a time that the time from the decrease of the absolute value |τ*| of the command torque to the switching of the control gain $\omega_c$ is longer than at least the time from the increase of the absolute value |τ*| of the command torque to the switching of the control gain $\omega_c$. For example, the transition time set as the holding time $T_h$ is not limited to the time for the complete transition from the transient response state to the steady state, but may be the time that can be regarded as the transition from the transient response state to the steady state. Therefore, the steady state is a state where the change of the motor torque τ can be regarded to be substantially constant, and may include a state where the motor torque τ changes at a level that can be regarded to be substantially constant. Therefore, the holding time $T_h$ may be set to be slightly shorter or may be set to be slightly longer than the time obtained by Formula (9).

Further, the control gain setting unit 207 (set time control unit 403) is configured to measure the transition time of the motor torque from the transient response state to the steady state and hold the previously set value of the control gain $\omega_c$ until after the transition time elapses in the present embodiment, but is not limited to this configuration. When the absolute value |τ*| of the command torque changes across a predetermined threshold and the absolute value |τ*| of the command torque decreases, it suffices that the control gain setting unit 207 is configured to hold the previously set value of the control gain $\omega_c$ until the motor torque transitions from the transient response state to the steady state.

For example, the control gain setting unit 207 may be configured to count the transition time of the motor torque from the transient response state to the steady state at a predetermined interval, and hold the previously set value of the control gain $\omega_c$ until the count value after a lapse of the transition time expires. As a result, the holding time $T_h$ can be set longer as compared with the case of measuring the transition time. For example, when the transition time is 3.1 msec and is counted every 0.5 msec, the holding time $T_h$ can be extended to 3.5 msec.

As described above, the time from the decrease of the absolute value |τ*| of the command torque to the switching of the control gain $\omega_c$ is longer than the time from the increase of the absolute value |τ*| of the command torque to the switching of the control gain $\omega_c$ in the first embodiment. Therefore, the control gain $\omega_c$ at the rising time of the absolute value |τ*| of the command torque can be also applied at the falling time of the absolute value |τ*| of the command torque. Therefore, when the absolute value |τ*| of the command torque changes suddenly, it is possible to realize a stable operation in which vibration, overshoot, undershoot, and the like of the motor torque during the transient response are suppressed. Further, the control gain $\omega_c$ that directly specifies the response time is switched in the present embodiment, and thus, the switching operation according to the present embodiment can be applied regardless of the type of the motor.

Second Embodiment

Figure 9:
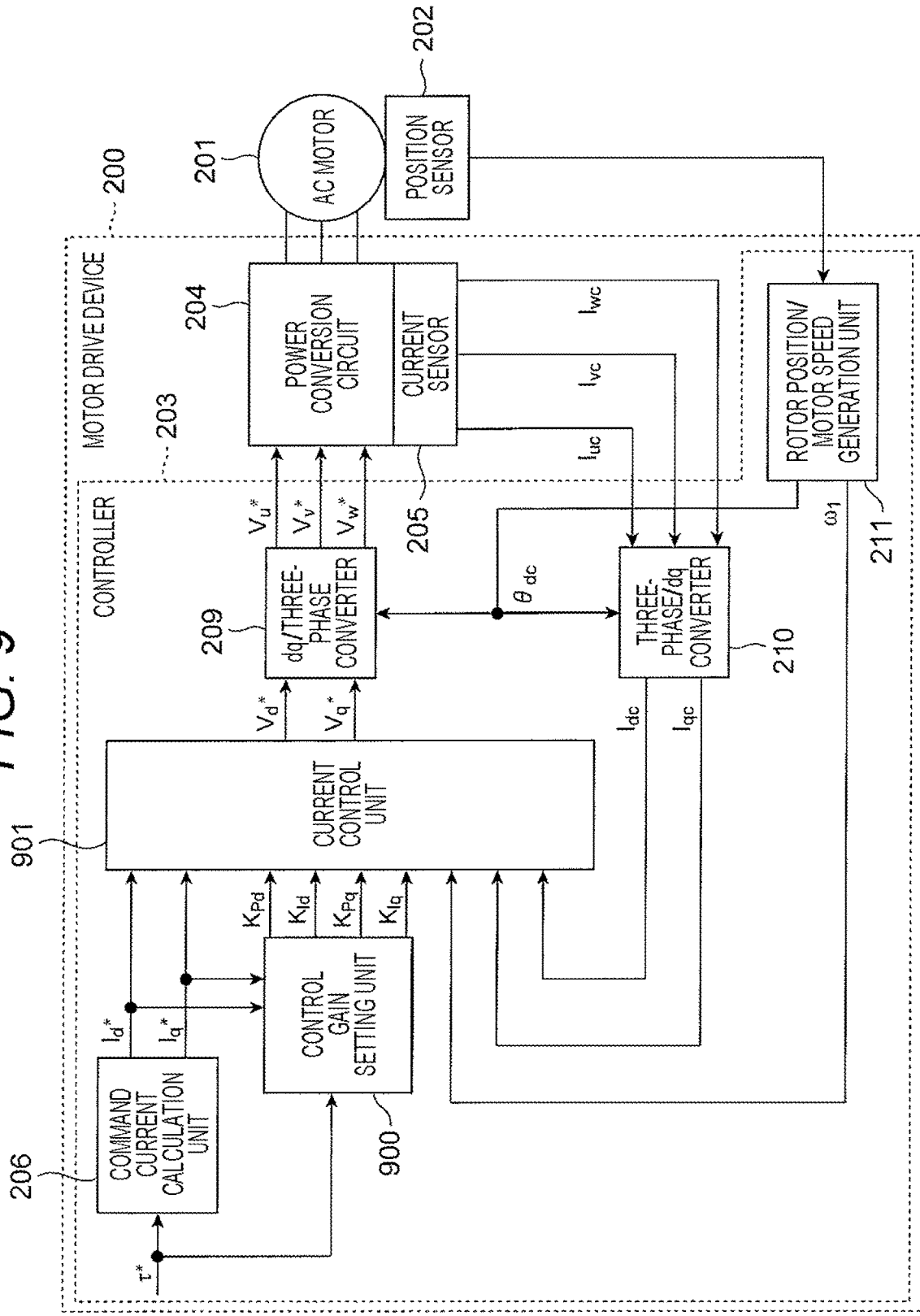
FIG. 9 is a configuration diagram of a motor drive device according to a second embodiment.
Figure 10:
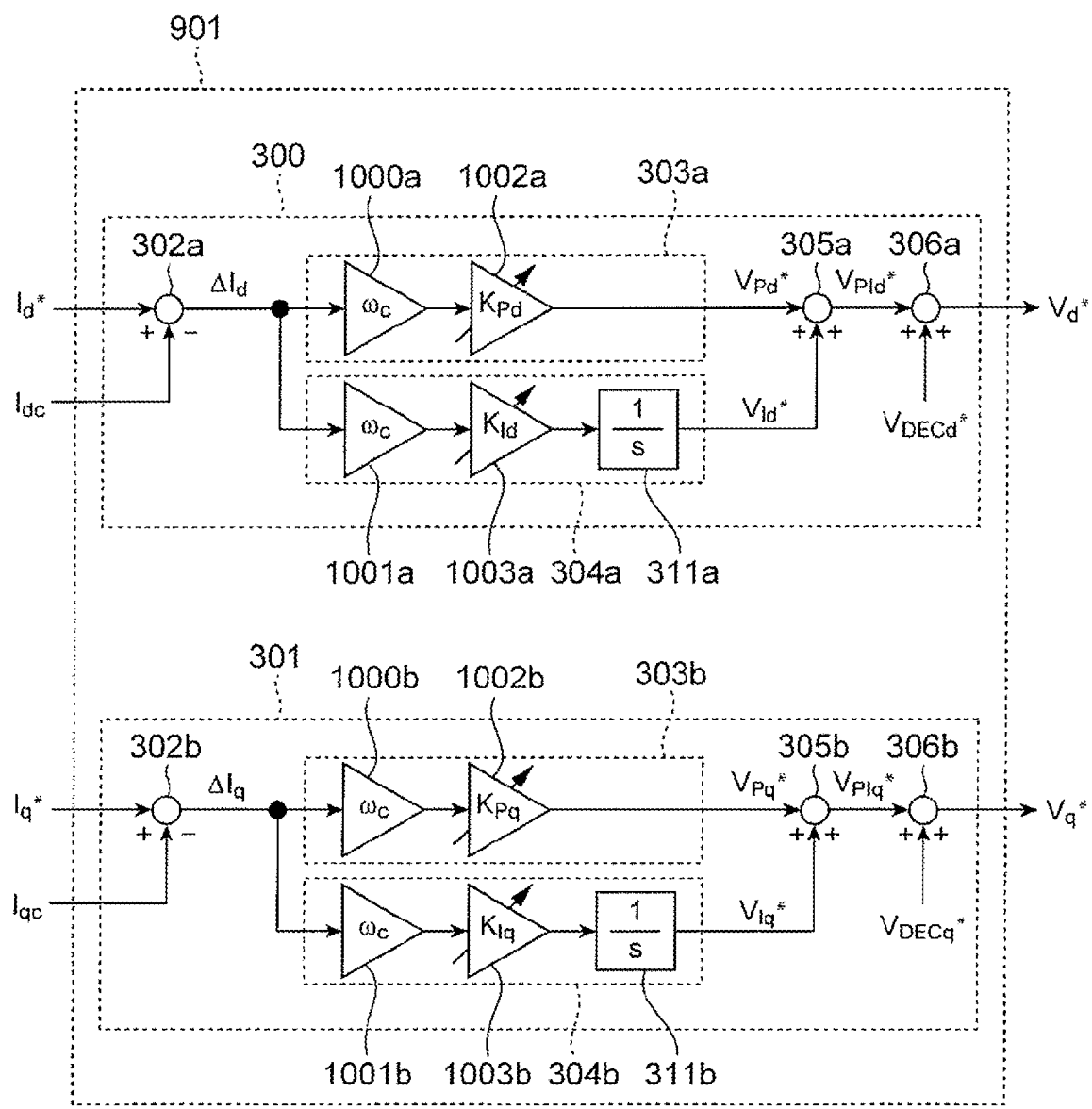
FIG. 10 is a configuration diagram of a current control unit according to the second embodiment.
Figure 11:
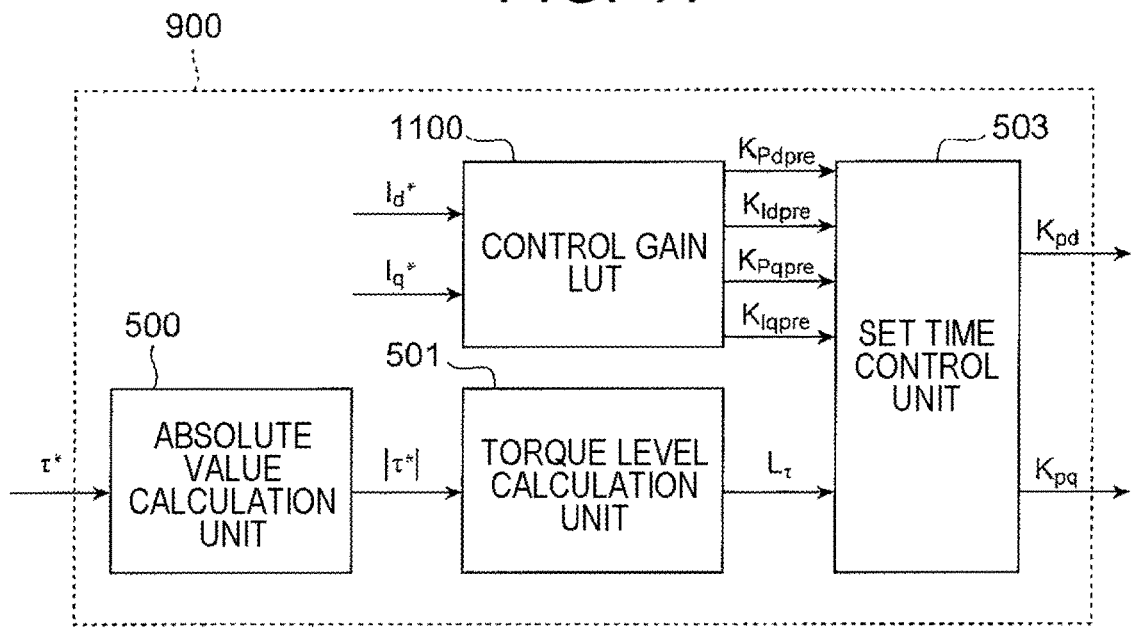
FIG. 11 is a configuration diagram of a control gain setting unit according to the second embodiment.

Subsequently, the motor drive device 200 according to a second embodiment will be described with reference to FIGS. 9 to 11. FIG. 9 is a configuration diagram of the motor drive device 200 according to the second embodiment. FIG. 10 is a configuration diagram of a current control unit 901 according to the second embodiment. FIG. 11 is a configuration diagram of a control gain setting unit 900 according to the second embodiment. Note that the motor drive device 200 according to the second embodiment is different from that of the first embodiment in that a control response speed of the current control unit 901 is adjusted using the d-axis P control gain $K_{Pd}$, the d-axis I control gain $K_{Id}$, the a-axis P control gain $K_{Pq}$, and the q-axis control gain $K_{Iq}$. Therefore, the configuration similar to that of the first embodiment will not be described.

As illustrated in FIG. 9, the current control unit 901 receives inputs of the d-axis P control gain $K_{Pd}$, the d-axis I control gain $K_{Id}$, the q-axis P control gain $K_{Pq}$, and the q-axis I control gain $K_{Iq}$ from the control gain setting unit 900, instead of the control gain $\omega_c$. As being clear from the above Formulas (2), (3), (6), and (7), the control response speed of the current control unit 208 can be also adjusted using the d-axis P control gain $K_{Pd}$, the d-axis I control gain $K_{Id}$, the q-axis P control gain $K_{Pq}$, and q-axis I control gain $K_{Iq}$. These control gains $K_{Pd}$, $K_{Id}$, $K_{Pq}$, and $K_{Iq}$ are switched, for example, based on a motor parameter having current dependence.

As illustrated in FIG. 10, in the current control unit 901, the control gain $\omega_c$, which is a constant value, is set in control gain multiplication units 1000a and 1001a, the d-axis P control gain $K_{Pd}$, which is a variable value, is set in a control gain multiplication unit 1002a, and the d-axis I control gain $K_{Id}$, which is a variable value, is set in a control gain multiplication unit 1003a. Further, in the current control unit 901, the control gain $\omega_c$, which is a constant value, is set in control gain multiplication units 1000b and 1001b, the q-axis P control gain $K_{Pq}$, which is a variable value, is set in a control gain multiplication unit 1002b, and the q-axis I control gain $K_{Iq}$, which is a variable value, is set in a control gain multiplication unit 1003b. In this manner, the current control unit 901 forms the motor drive device capable of switching the control response speed by setting the variable control gains $K_{Pd}$, $K_{Id}$, $K_{Pq}$, and $K_{Iq}$.

As illustrated in FIG. 11, the control gain setting unit 900 has a control gain LUT 1100 in which a d-axis P control gain $K_{Pdpre}$, a d-axis I control gain $K_{Idpre}$, a q-axis P control gain $K_{Pqpre}$, and a q-axis I control gain $K_{Iqpre}$ are stored in association with the d-axis command current $I_d^*$ and the q-axis command current $I_q^*$. The control gain setting unit 900 reads the control gains $K_{Pdpre}$, $K_{Idpre}$, $K_{Pqpre}$ and $K_{Iqpre}$ from the control gain LUT 1100 with the d-axis command current $I_d^*$ and the q-axis command current $I_q^*$ as arguments of the control gain LUT 1100. Since the look-up table is used to set the control gain, it is possible to read the control gains $K_{Pdpre}$, $K_{Idpre}$, $K_{Pqpre}$, and $K_{Iqpre}$ from the d-axis command current $I_d^*$ and the q-axis command current $I_q^*$ by a simple reference process instead of a complicated calculation process. Note that the d-axis command current $I_d^*$ and the g-axis command current $I_q^*$ are calculated by the command current calculation unit 206 (see FIG. 9) based on the command torque $\tau^*$. For this reason, the control gain is switched based on the command torque $\tau^*$ in the present embodiment.

A control gain switching operation in the present embodiment is realized by performing a process of "setting $K_{Pdpre}$ as $K_{Pd}$, setting $K_{Idpre}$ as $K_{Id}$, setting $K_{Pqpre}$ as $K_{Pq}$, and setting $K_{Iqpre}$ as $K_{Iq}$" in Steps S6, S11, and S14 and performing a process of "holding previously set values of $K_{Pd}$, $K_{Id}$, $K_{Pq}$ and $K_{Iq}$" in Steps S9 and S16 in the flowchart illustrated in FIG. 7. The setting of the holding time $T_h$ and the like other than the above are the same as those in the first embodiment.

As described above, a stable operation of motor torque during a transient response can be realized even in the second embodiment, which is advantageous for, for example, a motor in which the motor constant changes according to a current. Note that the motor constant is a parameter determined based on the use of the motor, and is, for example, a resistance value, an inductance, an induced voltage constant, or the like of the motor.

Third Embodiment

As a third embodiment, a configuration of combining the first embodiment and the second embodiment may be adopted. That is, it may be configured such that switching of the control gain $\omega_c$ based on the command torque $\tau^*$ and switching of the d-axis P control gain $K_{Pd}$, the d-axis I control gain $K_{Id}$, the q-axis P control gain $K_{Pq}$, and the q-axis I control gain $K_{Iq}$ based on the d-axis command current $I_d^*$ and the q-axis command current $I_q^*$. are used together. As a result, it is possible to perform more accurate current control. Even in the third embodiment, a stable operation of motor torque during a transient response can be realized.

Fourth Embodiment

Figure 12:
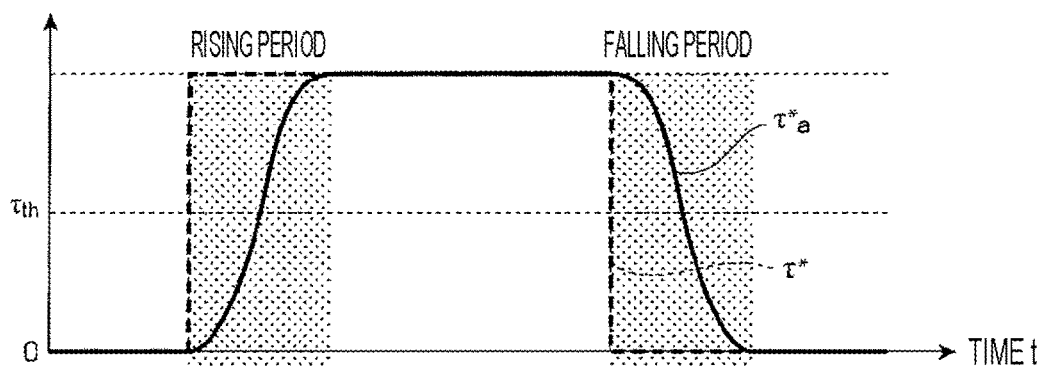
FIG. 12 is a conceptual waveform diagram of a control gain switching operation according to a fourth embodiment.
Figure 12:
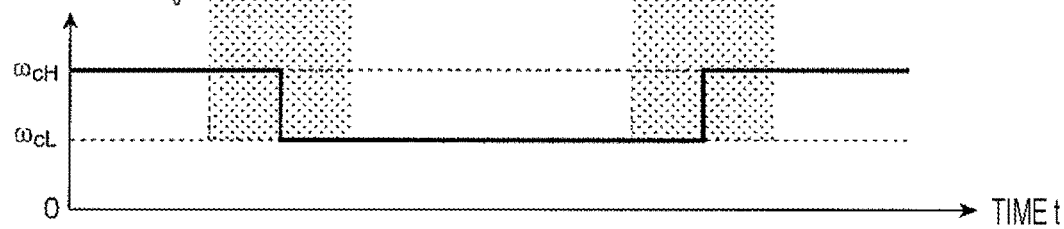

The control gain setting unit of each of the above embodiments is configured to measure the transition time (holding time $T_h$) from the transient response state to the steady state of the motor torque and hold the previously set value of the control gain until the transition time elapses, but is not limited to this configuration. It is also possible to switch the control gain by a filtering process. In this case, it is possible to avoid immediate switching of the control gain $\omega_c$ when the absolute value $|\tau^*|$ of the command torque falls although the time from the decrease of the absolute value $|\tau^*|$ of the command torque to the switching of the control gain $\omega_c$ is not longer than the time from the increase of the absolute value $|\tau^*|$ of the command torque to the switching of the control gain $\omega_c$. as in each of the above embodiments. Hereinafter, a motor drive device according to a fourth embodiment will be described with reference to FIG. 12. FIG. 12 is a conceptual waveform diagram of a control gain switching operation according to the fourth embodiment. Note that the motor drive device according to the fourth embodiment is different from that of the first embodiment in that a set time of the control gain $\omega_c$ is controlled by the filtering process. Therefore, the configuration similar to that of the first embodiment will not be described.

As illustrated in FIG. 12, a control gain setting unit makes a behavior of the command torque $\tau^*$ approximate to a behavior of the motor torque (actual torque) $\tau$ by the filtering process of the command torque $\tau^*$ such that the command torque $\tau^*$ imitates the behavior of the motor torque (actual torque) $\tau$.

Then, the control gain setting unit calculates the control gain $\omega_c$ based on command torque $\tau^*_a$ after the filtering process and sets the calculated control gain $\omega_c$ in a current control unit. In this case, the control gain $\omega_{cL}$ is set as the control gain co, when the absolute value $|\tau^*|$ of the command torque exceeds the threshold $\tau_{th}$, and the control gain $\omega_{cH}$ is set as the control gain $\omega_c$ when the absolute value $|\tau^*_a|$ of the command torque falls below the threshold $\tau_{th}$. Even with such a configuration, is possible to suppress the immediate switching of the control gain $\omega_c$ at the falling time of the absolute value $|\tau^*|$ of the command torque, and it is possible to realize a stable operation of the motor torque during a transient response. Note that the filtering process is realized, for example, by replacing a part of the control gain setting unit 207 illustrated in FIG. 4 with a low-pass filter.

Fifth Embodiment

Figure 13:
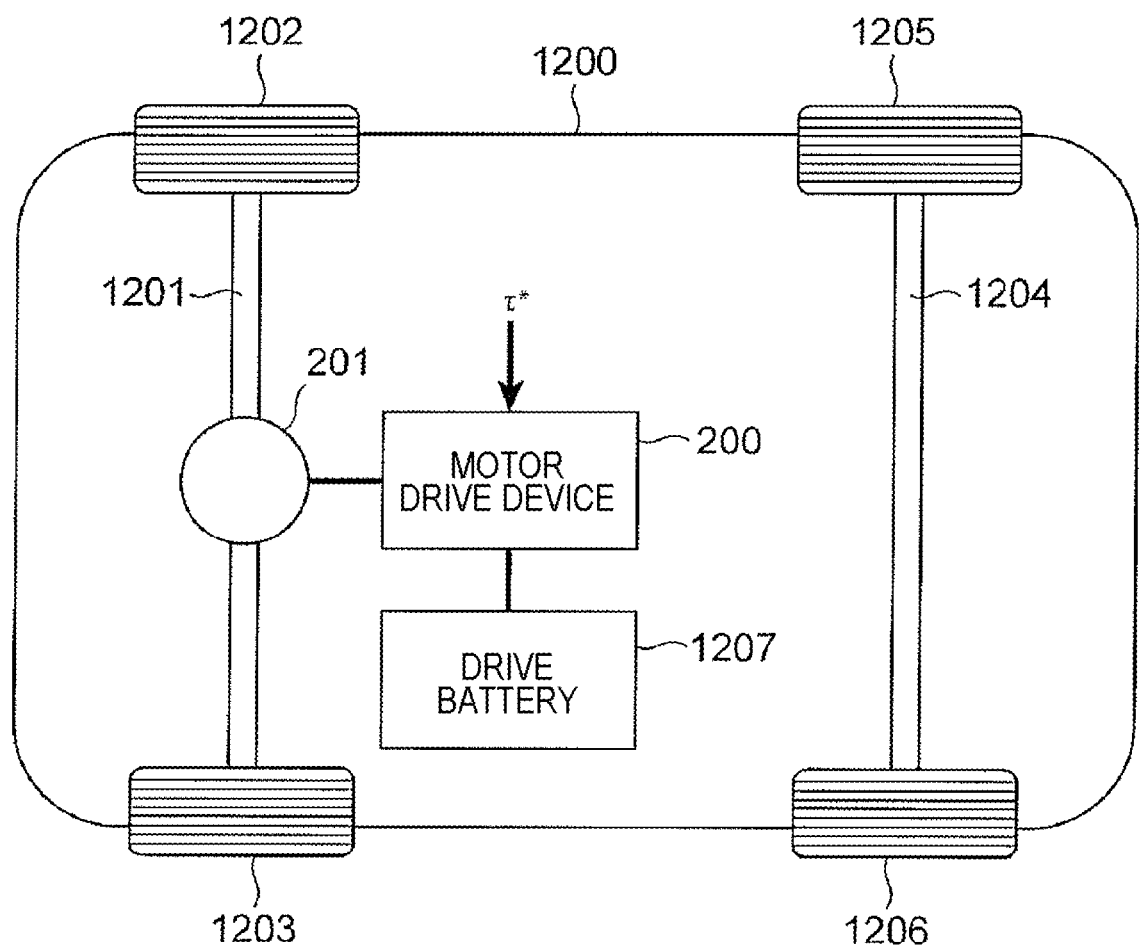
FIG. 13 is a configuration diagram of a motor vehicle system according to a fifth embodiment.

Next, a motor vehicle system according to a fifth embodiment will be described with reference to FIG. 13. FIG. 13 is a configuration diagram of the motor vehicle system according to the fifth embodiment. Note that a description will be given herein regarding an example of the motor vehicle system equipped with the motor drive device according to any one of the first embodiment, the second embodiment, the third embodiment, and the fourth embodiment.

As illustrated in FIG. 13, in a motor vehicle system 1200, a pair of axles 1201 and 1204 are pivotally supported on a vehicle body. Wheels 1202 and 1203 are fixed to both ends of one axle 1201, and wheels 1205 and 1206 are fixed to both ends of the other axle 1204. The AC motor 201 is connected to one axle 1201, and the rotational power of the AC motor 201 is transmitted to the wheels 1202 and 1203 via the axle 1201. The motor drive device 200 uses a drive battery 1207 as a power source, receives the command torque $\tau^*$ generated by a host system, and drives the AC motor 201.

The motor drive device 200 of the motor vehicle system 1200 generally has a certain gradient in setting of the command torque $\tau^*$. However, there is a case where the motor drive device 200 sets the command torque $\tau^*$ to 0 Nm in steps at the time of detecting an abnormality, and returns the command torque $\tau^*$ to the original set value in steps after recovery. Further, there is a case where the motor drive device 200 abruptly changes the command torque $\tau^*$ even when the vehicle slips. In these cases, switching to an appropriate control gain is performed by the motor drive device 200 according to a driving situation in the motor vehicle system 1200 according to the present embodiment, and it is possible to suppress vibration, overshoot, undershoot, and the like of motor torque that occur during a transient response.

Although the present embodiment relates to an electric vehicle, the same effect can be obtained by applying the motor drive device 200 to home appliances, railways, and the like. In short, the technique of the present disclosure can be similarly applied as long as a motor drive device having feedback type current control is provided.

Note that the technique of the present disclosure is not limited to the above-described embodiments, and includes various modifications. For example, the above-described embodiments have been described in detail in order to describe the technique of the present disclosure in an easily understandable manner, and are not necessarily limited to one including the entire configuration that has been described above. Further, configurations of another embodiment can be substituted for some configurations of a certain embodiment, and a configuration of another embodiment can be added to a configuration of a certain embodiment. Further, addition, deletion or substitution of other configurations can be also made with respect to some configurations of each embodiment.

Further, a part or all of each of the above-described configurations, functions, processing units, processing means, and the like may be realized, for example, by hardware by designing with an integrated circuit and the like. Further, the above-described respective configurations, functions and the like may be realized by software by the processor interpreting and executing a program for realizing the respective functions. Information such as programs, tables, and files that realize the respective functions can be recorded in a storage device such as a memory, a hard disk, and a solid state drive (SSD), or a recording medium such as an IC card, an SD card, and a DVD.

Further, only a control line and an information line considered to be necessary for the description have been illustrated in the drawings, and all control lines and information lines are not necessarily illustrated. It may be considered that most of the configurations are practically connected to each other.

REFERENCE SIGNS LIST 200 motor drive device
201 AC motor (motor)
203 controller
204 power conversion circuit
206 command current calculation unit
207 control gain setting unit
208 current control unit
401 torque level calculation unit
402 control gain LUT
403 set time control unit
900 control gain setting unit
901 current control unit
1100 control gain LUT
1200 motor vehicle system
1201 axle
1202 wheel
1203 wheel
1204 axle
1205 wheel
1206 wheel
1207 drive battery

The invention claimed is:

1. A motor drive device, which controls torque of a motor, comprising:
a power conversion circuit that drives the motor; and
a controller that controls the power conversion circuit, wherein the controller includes:
a command current calculation unit that generates a command current according to command torque for the motor;
a current control unit that performs feedback control for adjusting a current applied to the motor to the command current; and
a control gain setting unit that calculates a control gain used for the feedback control based on the command torque and sets the calculated control gain in the current control unit, and
the control gain setting unit configures a time from a decrease of an absolute value of the command torque to switching of the control gain to be longer than a time from an increase of the absolute value of the command torque to switching of the control gain.

2. The motor drive device according to claim 1, wherein the absolute value of the command torque changes in steps.

3. The motor drive device according to claim 1, wherein the control gain setting unit configures a time until switching of the control gain since the absolute value of the command torque changes across a predetermined threshold and the absolute value of the command torque decreases to be longer than the time from an increase of the absolute value of the command torque to switching of the control gain.

4. The motor drive device according to claim 1, wherein the control gain setting unit holds a previously set value of the control gain until motor torque transitions from a transient response state to a steady state when the absolute value of the command torque changes across a predetermined threshold and the absolute value of the command torque decreases.

5. The motor drive device according to claim 4, wherein the control gain setting unit measures a transition time of the motor torque from the transient response state to the steady state when the absolute value of the command torque changes across the predetermined threshold and the absolute value of the command torque decreases, and holds the previously set value of the control gain until after the transition time elapses.

6. The motor drive device according to claim 4, wherein when the absolute value of the command torque changes across the predetermined threshold and the absolute value of the command torque decreases, the control gain setting unit counts a transition time of the motor torque from the transient response state to the steady state at a predetermined interval and holds the previously set value of the control gain until a count value after the transition time elapses.

7. The motor drive device according to claim 1, wherein the control gain setting unit calculates a torque level value from the absolute value of the command torque, applies a hysteresis characteristic to changes when the torque level value decreases and increases, and configures a time from a decrease of the torque level value to switching of the control gain to be longer than a time from an increase of the torque level value to switching of the control gain.

8. The motor drive device according to claim 1, wherein the control gain setting unit has a look-up table in which the control gain is stored, and calculates an argument of the look-up table based on the absolute value of the command torque to read the control gain from the look-up table.

9. The motor drive device according to claim 1, wherein the control gain setting unit has a look-up table in which the control gain is stored, and reads the control gain from the look-up table using the command current as an argument of the look-up table.

10. A motor vehicle system comprising:
the motor drive device according to claim 1;
the motor driven by the motor drive device;
an axle connected to the motor;
a wheel fixed to the axle; and
a drive battery that serves as a power source of the motor drive device.

11. A motor drive device, which controls torque of a motor, comprising:
a power conversion circuit that drives the motor; and
a controller that controls the power conversion circuit,
wherein the controller includes:
a command current calculation unit that generates a command current according to command torque for the motor;
a current control unit that performs feedback control for adjusting a current applied to the motor to the command current; and
a control gain setting unit that calculates a control gain used for the feedback control based on the command torque and sets the calculated control gain in the current control unit, and
the control gain setting unit makes a behavior of the command torque match a behavior of motor torque by a filtering process of the command torque to control switching of the control gain based on the command torque having been subjected to the filtering process.

* * * * *